United States Patent
Hamada et al.

(10) Patent No.: US 11,891,681 B2
(45) Date of Patent: Feb. 6, 2024

(54) FERRITIC STAINLESS STEEL SHEET, METHOD FOR PRODUCING THE SAME, AND PART

(71) Applicant: NIPPON STEEL Stainless Steel Corporation, Tokyo (JP)

(72) Inventors: Junichi Hamada, Tokyo (JP); Atsutaka Hayashi, Tokyo (JP)

(73) Assignee: NIPPON STEEL STAINLESS STEEL CORPORATION, Tokyo (JP)

( * ) Notice: Subject to any disclaimer, the term of this patent is extended or adjusted under 35 U.S.C. 154(b) by 0 days.

(21) Appl. No.: 17/674,502

(22) Filed: Feb. 17, 2022

(65) Prior Publication Data
US 2022/0275492 A1 Sep. 1, 2022

(30) Foreign Application Priority Data
Feb. 17, 2021 (JP) .................. 2021-023091

(51) Int. Cl.
| | |
|---|---|
| C22C 38/54 | (2006.01) |
| C22C 38/42 | (2006.01) |
| C22C 38/44 | (2006.01) |
| C22C 38/46 | (2006.01) |
| C22C 38/48 | (2006.01) |
| C22C 38/50 | (2006.01) |
| C22C 38/52 | (2006.01) |
| C22C 38/02 | (2006.01) |
| C22C 38/04 | (2006.01) |
| C22C 38/06 | (2006.01) |
| C22C 38/00 | (2006.01) |

(Continued)

(52) U.S. Cl.
CPC .......... *C22C 38/54* (2013.01); *B23K 35/0233* (2013.01); *B23K 35/3086* (2013.01); *C21D 8/0205* (2013.01); *C21D 8/0226* (2013.01); *C21D 9/46* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *B23K 2103/05* (2018.08)

(58) Field of Classification Search
None
See application file for complete search history.

(56) References Cited

U.S. PATENT DOCUMENTS
2014/0294660 A1 10/2014 Kimura et al.

FOREIGN PATENT DOCUMENTS
| | | |
|---|---|---|
| JP | 2009-263714 A | 11/2009 |
| JP | 2012-140687 A | 7/2012 |

(Continued)

*Primary Examiner* — Anthony M Liang
(74) *Attorney, Agent, or Firm* — Birch, Stewart, Kolasch & Birch, LLP

(57) ABSTRACT

The present invention has as its technical problem to prevent cracking when producing a steel sheet by ferritic stainless steel sheet and provide a ferritic stainless steel sheet excellent in toughness and a part using the same. To solve this technical problem, the present invention provides steel comprised of, by mass %, C: 0.001 to 0.030%, Si: 0.01 to 1.00%, Mn: 0.01 to 1.00%, P: 0.010 to 0.050%, S: 0.0002 to 0.0100%, Cr: 10.0 to 20.0%, N: 0.001 to 0.030%, Nb: 0.10 to 0.40%, B: 0.0002 to 0.0030%, Al: 0.005 to 0.100%, and a balance of Fe and unavoidable impurities in which the amount of solute Nb being less than or equal to a smaller value of 0.20 and (Nb content-0.08) mass %.

10 Claims, 1 Drawing Sheet

(51) Int. Cl.
*C21D 8/02* (2006.01)
*C21D 9/46* (2006.01)
*B23K 35/02* (2006.01)
*B23K 35/30* (2006.01)
*B23K 103/04* (2006.01)

(56) References Cited

FOREIGN PATENT DOCUMENTS

| | | |
|---|---|---|
| JP | 2012-140888 A | 7/2012 |
| WO | WO 2013/085005 A1 | 6/2013 |

FERRITIC STAINLESS STEEL SHEET, METHOD FOR PRODUCING THE SAME, AND PART

FIELD

The present invention relates to a ferritic stainless steel sheet, a method for producing the same, and a part using that stainless steel sheet.

BACKGROUND

The exhaust gas path of an automobile is comprised of various parts such as an exhaust manifold, muffler, catalyst, flexible pipe, center pipe, and front pipe. When connecting these pipes, often use is made of fastening parts called flanges and brackets. In exhaust system parts of an automobile, the number of working steps is small and the work space need not be expansive, so flanges are proactively used. Further, from the viewpoint of the noise due to vibration and securing rigidity, thick flanges of 5 mm thickness or more are often used. Flanges are produced by pressing and also stamping etc. In the past, ordinary steel sheet had been utilized as a material. However, ordinary steel is poor in corrosion resistance, so rust called "initial rust" occurs after production of an automobile and the beautiful appearance is sometimes ruined. For this reason, use of stainless steel sheet instead of ordinary steel sheet as a flange material is being aggressively promoted.

Ferritic stainless steel sheet has less of an Ni content and is lower in cost compared with austenitic stainless steel sheet, but it is known to be poor in toughness. If the toughness is low, at the time of running the sheet in the process of production of steel sheet and at the time of uncoiling, the sheet sometimes ends up breaking. Further, sometimes cracking occurs at the time of shearing, stamping, and other work processes when forming parts. Furthermore, the problem arises that the parts end up cracking when impact is applied in a low temperature environment of the winter season and the automobile exhaust pipe ends up being damaged. In particular, if the toughness is low in a 5 mm or more thick ferritic stainless steel sheet, sometimes the reliability becomes low when applying this steel sheet to a fastening part.

Several attempts have been made to secure the toughness of ferritic stainless steel sheet. For example, PLTs 1 and 2 disclose production conditions for mass producing thickness 5 to 12 mm ferritic stainless steel hot rolled coils or hot rolled annealed coils.

PLT 1 covers Ti-containing ferritic stainless steel and discloses the method of adjusting the hardness and Charpy impact value by making the coiling temperature 570° C. or more and dipping the coil in water.

PLT 2 covers an Nb-containing ferritic stainless steel and discloses a method of adjusting the hardness and Charpy impact value by making the hot rolling and finish temperature 890° C. or more, coiling at 400° C. or less, and dipping the coil in water.

PLT 3 discloses ferritic stainless steel excellent in cold cracking resistance with a certain extent or more of length of subgrain boundaries with small crystal orientation differences of the ferrite phases. This is obtained by making the hot rolling finishing temperature 800 to 1000° C. and the coiling temperature over 650° C. to 800° C. and dipping in a water tank after coiling.

PLT 4 discloses ferritic stainless steel sheet excellent in toughness defining a ratio of grain boundaries in the precipitates.

CITATIONS LIST

Patent Literature

[PTL 1] Japanese Unexamined Patent Publication No. 2012-140687
[PTL 2] Japanese Unexamined Patent Publication No. 2012-140688
[PTL 3] WO2013/085005
[PTL 4] Japanese Unexamined Patent Publication No. 2009-263714

SUMMARY

Technical Problem

The ferritic stainless steels described in PTLs 1 and 2 prescribe hot rolling conditions from the viewpoint of improvement of the toughness of hot rolled sheet or hot rolled annealed sheet, but control of the total coil length to the above conditions is difficult and the governing factors in the metal structure for improvement of toughness are unclear.

The ferritic stainless steels described in PTLs 3 and 4 attempt to improve toughness by control of the properties of crystal grain boundaries (for example, the size of orientation differences of the crystal grain boundaries) and precipitates on the grain boundaries, but did not necessarily reach the level of toughness satisfactory for flange applications.

Therefore, the present invention has as its object to solve the above problem in the existing art and provide ferritic stainless steel sheet excellent in toughness.

Solution to Problem

To solve this problem, the inventors studied the toughness of ferritic stainless steel sheet from the viewpoint of the constituents and the control of the structure in the production process. In particular, they engaged in detailed research from the viewpoint of the amount of solute Nb contained for solution strengthening and countering intergranular corrosion at the weld zones. As a result, they discovered that control of the amount of solute Nb is extremely effective for improvement of the toughness of ferritic stainless steel sheet, in particular hot rolled steel sheet or hot rolled and annealed steel sheet.

The gist of the present invention for solving this technical problem lies in (1) A ferritic stainless steel sheet comprising, by mass %,
C: 0.001 to 0.030%,
Si: 0.01 to 1.00%,
Mn: 0.01 to 1.00%,
P: 0.010 to 0.050%,
S: 0.0002 to 0.0100%,
Cr: 10.0 to 20.0%,
N: 0.001 to 0.030%,
Nb: 0.10 to 0.40%,
B: 0 to 0.0030%,
Al: 0 to 0.100%, and
a balance of Fe and unavoidable impurities,
the amount of solute Nb being less than or equal to a smaller value of 0.20 mass % and (Nb content-0.08) mass %.

(2) The ferritic stainless steel sheet according to (1) further comprising, by mass %, one or more of
Ti: 0 to 0.20%,
Ni: 0 to 1.00%,
Mo: 0 to 2.0%,
Cu: 0 to 3.0%,
V: 0 to 1.00%,
Mg: 0 to 0.0030%,
Sn: 0 to 0.30%,
Sb: 0 to 0.30%,
Zr: 0 to 0.10%,
Ta: 0 to 0.10%,
Hf: 0 to 0.10%,
W: 0 to 2.00%,
Co: 0 to 0.20%,
Ca: 0 to 0.0030%,
REM: 0 to 0.050%, and
Ga: 0 to 0.10%.

(3) The ferritic stainless steel sheet according to (1) or (2), wherein when a thickness of the stainless steel sheet is "t", a number density of Nb-containing precipitates of grain sizes of 1 μm or more is $0.005/\mu m^2$ or less in a depth range of t/2 to t/4 of from the surface in a cross-section in a thickness direction.

(4) The ferritic stainless steel sheet according to any one of (1) to (3), wherein a grain size of the Nb-containing precipitate is 2 μm or less.

(5) A method for producing the ferritic stainless steel sheet comprising heating a slab containing the constituents according to (1) or (2) to 1230° C. or more, hot rolling so that a ratio of a start temperature of finish rolling (° C.) and a finish temperature of finish rolling (° C.) (start temperature of finish rolling (° C.)/finish temperature of finish rolling (° C.)) becomes 1.10 or more, then coiling at 500° C. or less.

(6) The method for producing the ferritic stainless steel sheet according to (5) further comprising cooling the hot rolled steel sheet at a cooling rate of 20° C./sec or more, then coiling the hot rolled steel sheet.

(7) The method for producing the ferritic stainless steel sheet according to (5) or (6) further comprising heating the coiled steel sheet to 900 to 1050° C., then holding and annealing the coiled steel sheet for 60 seconds or more.

(8) A part using the ferritic stainless steel sheet according to any one of (1) to (4) for at least a portion.

(9) The part according to (8) wherein the ferritic stainless steel sheet is joined with another part by brazing or arc welding.

Advantageous Effects of Invention

According to the present invention, it is possible to efficiently produce ferritic stainless steel sheet excellent in toughness without requiring new facilities. Further, by using the ferritic stainless steel sheet according to the present invention for a part, it is possible to obtain a part excellent in toughness while making active use of existing facilities.

DESCRIPTION OF EMBODIMENTS

Figure 1:
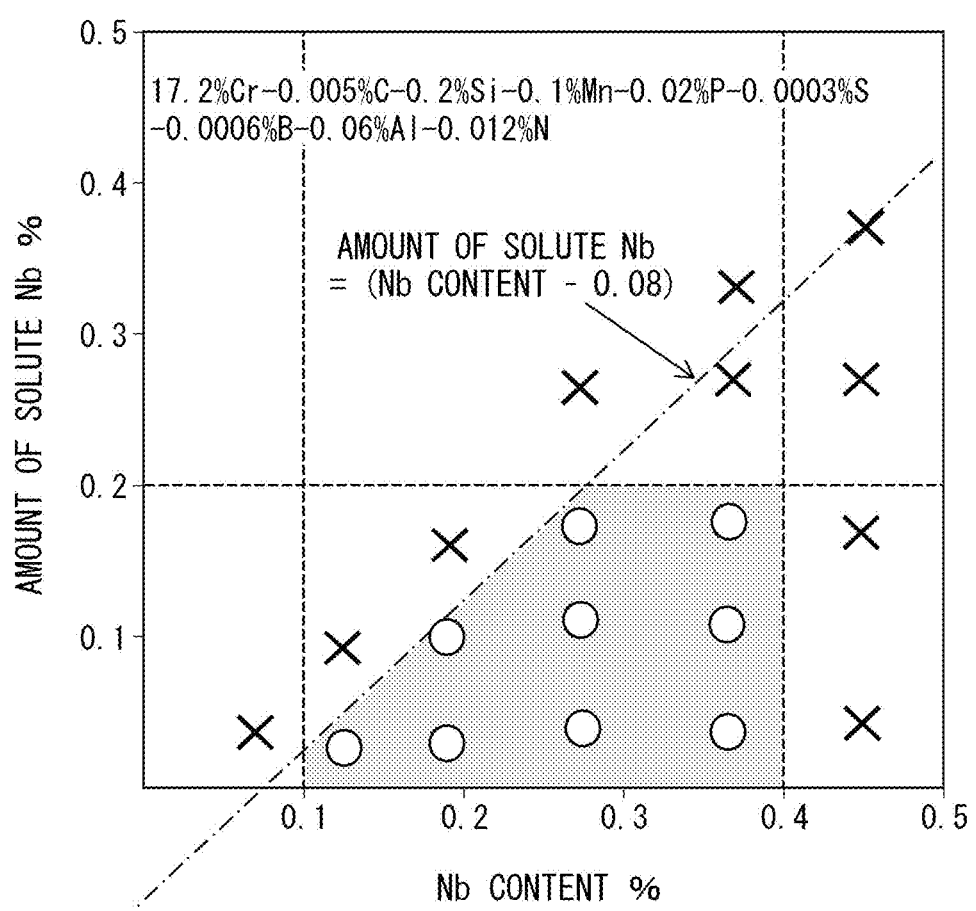
FIG. 1 is a view showing the relationship among the Nb content, amount of solute Nb, and toughness.

Below, the present invention will be explained. Unless otherwise indicated, the "%" relating to the constituents indicate mass % in the steel. If the lower limit is not particularly defined, non-inclusion (0%) may also be included.

It has been known in the past that refinement of the crystal grains, refinement of the precipitates, and crystal orientation contribute to improvement of toughness. However, with the previous knowledge, it has been difficult to secure sufficient toughness for applications as fastening parts from hot rolled sheets or hot rolled annealed sheets of ferritic stainless steel with many contained elements. In particular, thickness 5 mm or more ferritic stainless steel sheet is even more difficult to secure toughness for.

The inventors took note of the amount of solute Nb in the ferrite phases of the matrix phases and investigated in detail the relationship with toughness. As a result, they discovered that the toughness is improved by making the amount of solute Nb the smaller value of 0.2 mass % and (Nb content-0.08) mass % or less and making the Nb precipitates finely disperse.

FIG. 1 shows the relationship between the Nb content (mass % to total) of 17.2% Cr-0.005% C-0.2% Si-0.1% Mn-0.02% P-0.0003% S-0.0006% B-0.06% Al-0.012% N ferritic stainless steel (thickness 8 mm), the amount of solute Nb (mass % to total), and toughness.

Here, the amount of solute Nb is found by measuring the amount of precipitated Nb by extraction residue analysis and defining the difference of the amount of precipitated Nb from the Nb content as the amount of solute Nb. For the extraction residue analysis, a tetramethyl ammonium chloride solution and 0.2 μm size filter were used to extract the precipitates in the steel and analyze them by ICP.

Further, the toughness is evaluated by a Charpy impact test. A V-notch test piece (given V-notch in width direction) is taken from a hot rolled annealed sheet. The impact value is measured at ordinary temperature based on JIS Z2242. 20 $J/cm^2$ or more was evaluated as passing (good) and less than 20 $J/cm^2$ (below, sometimes referred to as "low toughness" in this Description) was evaluated as not passing (poor). This is because if 20 $J/cm^2$ or more, in the process of production of the hot rolled steel sheet, production is possible without brittle fracture.

The present inventors discovered from FIG. 1 that there is a relationship between the amount of solute Nb (if changing the viewpoint, the amount of precipitation of Nb) and toughness. They further studied improvement of toughness and obtained the following finding.

It was learned that in the range of an Nb content of 0.10 to 0.40%, if the amount of solute Nb is greater than the smaller value of either 0.2% and (Nb content-0.08) mass %, the toughness will be low, but if the amount of solute Nb is less than or equal to the value of the smaller of 0.20% and (Nb content-0.08) mass %, the toughness is improved.

If the Nb content is less than 0.10%, Cr carbides and nitrides are formed and become starting points of brittle fracture, so the toughness becomes lower. Further, if the amount of Nb is over 0.40%, coarse Nb(C, N) (Nb carbonitrides) are formed during the hot rolling, in particular the slab heating stage, and the toughness becomes lower. On the other hand, even if the Nb content is 0.40% or less, if the amount of solute Nb is larger than the smaller value of 0.20% and (Nb content-0.08) mass %, it is believed that the steel becomes remarkably harder and becomes lower in toughness due to the solute Nb in the ferrite phases of the matrix phases.

The effect of hardening by the solute Nb on the toughness had not been found in the past, but it is thought that when brittle fracture (cleavage fracture) occurs starting from inclusions or oxides and the cracks propagate to the cleavage of the ferrite phases, the propagation is fast if the ferrite phases are hard, but if the amount of solute Nb is made the smaller value of 0.2% and (Nb content-0.08) mass % or less and the steel becomes relatively soft, the speed of propagation of the cleavages falls and the value of toughness rises.

Furthermore, the inventors discovered that when the amount of solute Nb is made the smaller value of 0.2% and (Nb content-0.08) mass % or less, by evenly spreading the fine Nb-containing precipitates (carbonitrides of Nb or complex precipitates including the same), the toughness value is further improved. That is, the number density of large Nb-containing precipitates with a grain size of 1 μm or more may be made $0.005/\mu m^2$ or less at the center part of the steel sheet, preferably $0.004/\mu m^2$ or less, $0.003/\mu m^2$ or less, $0.002/\mu m^2$ or less, or $0.001/\mu mm^2$ or less.

Further, if there are coarse Nb-containing precipitates with grain sizes over 2 μm, they easily become starting points of fracture and cause the toughness to deteriorate, so the content should be made as small as possible. Therefore, the grain size of the Nb-containing precipitates is preferably made 2 μm or less.

Here, the density of the Nb-containing inclusions is found by examining a cross-section of a depth from the surface of t/2 to t/4 in range, where the thickness of the steel sheet is "t", in a cross-section in the direction of sheet thickness. The grain size of the Nb-containing inclusions is made the one found as the circle equivalent diameter equal to the area.

Next, the range of constituents of the steel will be explained.

C (carbon) causes the toughness to deteriorate due to the solute carbon causing hardening and precipitation of carbides, so the smaller the content, the better. If over 0.030%, Cr carbides form causing a drop in toughness and deterioration of the intergranular corrosion resistance of the weld zone, so the upper limit may be made 0.030%, preferably 0.010%. On the other hand, excessive reduction leads to an increase in the refining costs, so the lower limit may be made 0.001%, preferably 0.002%.

Si is an element which is sometimes contained as a deoxidizing element and also causes an improvement in the oxidation resistance, but is a solution strengthening element, so from the viewpoint of toughness, should be as little as possible. The upper limit may be made 1.00%, preferably 0.50%. On the other hand, to secure oxidation resistance, the lower limit may be made 0.01%, preferably 0.05%.

Mn, like Si, is a solution strengthening element, so the content should be as little as possible. Further, if over 1.00%, MnS and other precipitates form and become starting points of brittle fracture, so the upper limit may be made 1.00%, preferably 0.50%. On the other hand, excessive reduction leads to an increase in the refining costs. In addition, a fine content of Mn causes an improvement in the descaling ability, so the lower limit may be made 0.01%, preferably 0.05%.

P, like Mn and Si, is solution strengthening element and causes a material to harden, so from the viewpoint of the toughness, the smaller the content, the better. Further, if over 0.050%, phosphides acting as starting points of brittle fracture are formed, so the upper limit may be made 0.050%, preferably 0.030%. However, excessive reduction leads to an increase in the material costs, so the lower limit may be made 0.010%, preferably 0.015%.

S is an element causing the corrosion resistance to deteriorate, so the smaller the content, the better. Further, if over 0.0100%, MnS, $Ti_4C_2S_2$, and other precipitates acting as starting points of brittle fracture are formed, so the upper limit may be made 0.0100%, preferably 0.0060%. On the other hand, it has the effect of bonding with Mn or Ti to improve the stampability when shaping parts. This is obtained from 0.0002%, so the lower limit may be made 0.0002%, preferably 0.0004%.

Cr is an element improving the corrosion resistance or oxidation resistance. If considering the resistance to salt damage demanded from fastening parts, the lower limit may be made 10%, preferably 11%. On the other hand, excessive inclusion causes deterioration of the shapeability and toughness due to hardening and sometimes invites sheet breakage at the time of production. For example, if including over 20%, coarse Cr carbides and nitrides and other precipitates are formed causing the toughness to drop, so the upper limit may be made 20%, preferably 18%.

N, like C, causes the toughness to deteriorate, so the smaller the content the better. Further, if over 0.030%, nitrides acting as starting points of brittle fracture form, so the upper limit may be made 0.030%, preferably 0.020%. On the other hand, excessive reduction leads to an increase in the refining costs, so the lower limit may be made 0.001%, preferably 0.005%.

Nb is included to improve the high temperature strength and also to bond with C and N to improve the corrosion resistance, intergranular corrosion resistance, and toughness. To reliably obtain this action, the lower limit may be made 0.10%, preferably 0.11%, 0.12%, 0.13%, 0.14%, 0.15%, 0.16%, 0.17%, 0.18%, 0.19%, 0.20%, 0.21%, 0.22%, 0.23%, 0.24%, or 0.25%. On the other hand, excessive inclusion causes hardening and deterioration of the shapeability and also, due to coarse Nb(C, N) or the heat history, causes $(Fe, Nb)_6C$ or $Fe_2Nb$ to precipitate to cause remarkable deterioration of the toughness, so the upper limit may be made 0.40%, preferably 0.38%, 0.35%, 0.33%, or 0.30%.

B is an element which segregates at the grain boundaries to improve the secondary workability of the product. It may be included in accordance with need to improve the stampability when forming fastening parts. Therefore, the lower limit of the content does not have to be particularly set and may be 0%. To reliably obtain this action, the lower limit may be made 0.0002%, preferably 0.0003%. On the other hand, excessive inclusion causes borides to precipitate and the toughness to deteriorate, so the upper limit may be made 0.0030%, preferably 0.0010%.

Al is sometimes included as a deoxidizing element and may be included in accordance with need. Therefore, the lower limit of the content does not have to be particularly set and may be 0%. To reliably obtain that action, the lower limit may be made 0.005%, preferably 0.010%. On the other hand, excessive inclusion forms $Al_2O_3$ and other inclusions. These not only cause hardening, but also act as starting points of fracture causing the toughness to drop and the weldability (in particular the brazeability) and surface quality to to deteriorate, so the upper limit may be made 0.100%, preferably 0.080%.

The balance of the above steel constituents comprises Fe and impurities. Here, "impurities" mean constituents which enter due to various factors in the production process such as materials like ore, scrap, and other such materials when industrially producing steel and which are allowed in a range not having a detrimental effect on the present invention.

Further, the ferritic stainless steel of the present embodiment may also contain, instead of the Fe, one or more of Ti, Ni, Mo, Cu, V, Mg, Sn, Sb, Zr, Ta, Hf, W, Co, Ca, REM, and Ga. These elements need not be included, but by inclusion, further advantageous effects are obtained. Below, these elements will be explained.

Ti is an element which is contained in accordance with need in order to bond with C, N, and S and improve the corrosion resistance, intergranular corrosion resistance, and toughness. The lower limit of the content does not have to be particularly set and may be 0%, but to enable the C, N pinning action to be reliably expressed, the lower limit may be made 0.01%, preferably 0.02%. On the other hand, inclusion of over 0.20% not only causes coarse Ti(C, N) to precipitate and the toughness to remarkably deteriorate, but also causes the weldability (in particular the brazeability) to worsen, so the upper limit may be made 0.20%, preferably 0.05%.

Ni promotes the suppression of crevice corrosion and repassivation to thereby cause improvement of the resistance to initial rusting, so is included in accordance with need. The lower limit of the content does not have to be particularly set and may be 0%, but to reliably obtain this action, the lower limit may be made 0.10%, preferably 0.20%. On the other hand, excessive inclusion causes hardening and deterioration of toughness and also results in stress corrosion cracking more easily occurring, so the upper limit may be made 1.00%, preferably 0.30%.

Mo is an element improving the corrosion resistance and high temperature strength. In particular, it is an element suppressing crevice corrosion when having a crevice structure. The lower limit of the content does not have to be particularly set and may be 0%, but to reliably obtain this action, the lower limit may be made 0.1%, preferably 0.5%. On the other hand, if over 2.0%, the shapeability deteriorates remarkably and the toughness deteriorates due to hardening, so the upper limit may be made 2.0%, preferably 1.2%. Further, if considering the manufacturing costs and the stampability at the time of working a part, the upper limit is desirably 0.9%. If considering application to parts where corrosion resistance and high temperature strength are demanded more, the lower limit is desirably 0.5%.

Cu improves the high temperature strength and also promotes the suppression of crevice corrosion and repassivation, so is included in accordance with need. The lower limit of the content does not have to be particularly set and may be 0%, but to reliably obtain this action, the lower limit may be made 0.1%, preferably 0.2%. On the other hand, excessive inclusion causes hardening and deterioration of shapeability and toughness due to ε-Cu precipitation, so the upper limit may be made 3.0%, preferably 1.2%.

V suppresses crevice corrosion and also contributes to improvement of toughness by inclusion in a fine amount, so is included in accordance with need. The lower limit of the content does not have to be particularly set and may be 0%, but to reliably obtain this action, the lower limit may be made 0.05%. On the other hand, excessive inclusion causes hardening and the shapeability to deteriorate and also leads to deterioration of toughness due to precipitation of coarse V(C, N), so the upper limit may be made 1.00%, preferably 0.20%.

Mg is an element which is sometimes contained as a deoxidizing element and also causes refinement of the structure of the slab and contributes to improvement of the shapeability. Further, Mg oxides become sites for precipitation of Ti(C, N), Nb(C, N), and other carbonitrides and have the effect of causing fine dispersion and precipitation of the same. The lower limit of the content does not have to be particularly set and may be 0%, but to reliably obtain this action and contribute to improvement of toughness, the lower limit may be made 0.0002%, preferably 0.0003%. On the other hand, excessive inclusion leads to deterioration of the weldability and corrosion resistance, so the upper limit may be made 0.0030%, preferably 0.0010%.

Sn and Sb contribute to improvement of the corrosion resistance and high temperature strength. The lower limits of the contents do not have to be particularly set and may be 0%, but in accordance with need these may be included in 0.01% or more, preferably 0.02% or more. On the other hand, inclusion over 0.30% sometimes causes slab cracking at the time of production of the steel sheet, so the upper limit may be made 0.30%, preferably 0.10%.

Zr, Ta, and Hf bond with C or N to contribute to improvement of toughness. The lower limits of the contents do not have to be particularly set and may be 0%, but in accordance with need these may be included in 0.01% or more, preferably 0.02% or more. On the other hand, inclusion over 0.10% causes an increase in costs and also causes the manufacturability to remarkably deteriorate, so the upper limit may be made 0.10%, preferably 0.07%.

W contributes to improvement of the corrosion resistance and high temperature strength. The lower limit of the content does not have to be particularly set and may be 0%, but in accordance with need this may be included in 0.01% or more, preferably 0.05% or more. On the other hand, inclusion over 2.00% leads to deterioration of toughness and an increase in costs at the time of production of the steel sheet, so the upper limit may be made 2.00%, preferably 1.80%.

Co contributes to improvement of the high temperature strength. The lower limit of the content does not have to be particularly set and may be 0%, but in accordance with need this may be included in 0.01% or more, preferably 0.02% or more. On the other hand, inclusion over 0.20% leads to deterioration of toughness and an increase in costs at the time of production of the steel sheet, so the upper limit may be made 0.20%, preferably 0.09%.

Ca is sometimes included for desulfurization. The lower limit of the content does not have to be particularly set and may be 0%, but to reliably obtain this effect, the lower limit may be made 0.0001%, preferably 0.0002%. On the other hand, inclusion of over 0.0030% causes coarse CaS to be formed and causes deterioration of the toughness and corrosion resistance, so the upper limit may be made 0.0030%, preferably 0.0020%.

REMs may be included from the viewpoint of improvement of toughness and improvement of oxidation resistance through refinement of various precipitates. The lower limit of the content does not have to be particularly set and may be 0%, so is sometimes included in accordance with need. To reliably obtain this effect, the lower limit may be made 0.001%, preferably 0.008%. On the other hand, inclusion over 0.050% causes the castability to remarkably worsen, so the upper limit may be made 0.050%, preferably 0.040%. REMs (rare earth metals), in accordance with the general definition, is the general term for the two elements of scandium (Sc) and yttrium (Y) and the 15 elements from lanthanum (La) to lutetium (Lu) (lanthanoids). These REM elements may be included alone or a plurality of REM elements may be included. If including a plurality of REM elements, the total amount of these should fall in the above range of the upper limit and lower limit.

Ga improves the corrosion resistance and suppresses the hydrogen embrittlement. The lower limit of the content does not have to be particularly set and may be 0%, but from the viewpoint of formation of sulfides and hydrides, the lower limit is 0.0002%, preferably 0.0010%. On the other hand, from the viewpoint of the manufacturability and cost, the upper limit may be made 0.1000%, preferably 0.0040%.

The other constituents are not particularly defined in the present invention, but in the present embodiment, Bi etc. may in accordance with need be included in 0.001 to 0.100%.

Next, the method of production will be explained.

The steel sheet of one embodiment according to the present invention is produced by the process of steelmaking-hot rolling, steelmaking-hot rolling-pickling, or steelmaking-hot rolling-annealing-pickling. In steelmaking, the method of melting steel containing the above constituents by a converter or electric furnace, then secondarily refining it is suitable. The molten steel adjusted in constituents is made into a slab by a known casting method (for example, continuous casting method). The slab is heated to a predetermined temperature and is hot rolled to a predetermined sheet thickness.

Normally, to reduce the amount of solute Nb, the general practice has been to cause the precipitation of Nb(C, N), M6C, Laves phases, and other Nb-based precipitates, but if performing general treatment for precipitation, the aggregation and coarsening of the precipitates conversely cause a drop in toughness. To solve this, in the present embodiment, the fine precipitation in the hot rolling process is used to reduce the amount of solute Nb and refine the precipitates.

In the present embodiment, in particular to control the amount of solute Nb to promote softening, the heating temperature right before the hot rolling (hot rolling heating temperature), ratio of start temperature of finish rolling and finish temperature of finish rolling, and coiling temperature are prescribed. The heating temperature of the hot rolling is made 1230° C. or more from the viewpoint of reduction of the starting points of fracture due to fine precipitation of Nb(C, N) (carbonitrides of Nb) and control of the amount of solute Nb. If less than 1230° C., at the time of slab heating, Nb(C, N) precipitates and coarsens forming starting points of fracture. To lower the toughness, the lower limit may be made 1230° C. On the other hand, if over 1300° C., at the time of heating, the slab greatly deforms and the precision of thickness and surface quality deteriorate, so preferably the temperature is 1300° C. or less.

After heating the slab, rough rolling and finish rolling are used to produce the hot rolled steel sheet. In the rough rolling after slab heating, the rolling reduction per pass is made 30% or less and the rolling is performed by five to nine passes. The end temperature is made generally about 1100° C. In between the passes of the rough rolling, Nb(C, N) and Laves phases finely precipitate, so the solute Nb is reduced. After this rough rolling, finish rolling is performed by five to nine passes or so for high speed continuous rolling.

In the present embodiment, the ratio of the start temperature of finish rolling (° C.) and the finish temperature of finish rolling (° C.) (start temperature of finish rolling (° C.)/finish temperature of finish rolling (° C.)) may be made 1.10 or more. After the finish rolling, the obtained steel sheet may be cooled and coiled at 500° C. or less. Due to this temperature control, in the present embodiment, at the stage of the hot rolled steel sheet, the solute Nb can be controlled the value of the smaller of 0.20% and (Nb content-0.08) mass % or less to secure the toughness.

The temperature fluctuates in the longitudinal direction of a steel strip after rough rolling depending on the slab heating temperature and the rough rolling conditions, but the start temperature of the finish rolling is 950 to 1100° C. and the end temperature is 800 to 900° C. At this time, if the difference of the start temperature of finish rolling and the finish temperature of finish rolling is small, in the finish rolling, Nb(C, N) and other Nb-based precipitates are not formed and the amount of solute Nb is not reduced. In the present embodiment, the ratio of the starting temperature and end temperature of the finish rolling (=start temperature of finish rolling (° C.)/finish temperature of finish rolling (° C.)) was made 1.10 or more to enable both fine precipitation of Nb(C, N) and reduction of the amount of solute Nb between the finish stands. The ratio of this start temperature and end temperature is preferably 1.15 or more, 1.20 or more, 1.22 or more, 1.24 or more, or 1.25 or more. Here, the start temperature and end temperature of the finish rolling are not particularly defined, but from the viewpoint of the surface quality, the start temperature is desirably made 1000° C. or more and the end temperature made 850° C. or more.

After the finish rolling, the obtained steel sheet is cooled and coiled at 500° C. or less, but this cooling after finish rolling may be made as rapid cooling as possible. By rapid cooling, coarsening of Nb (C, N) or Laves phases precipitated up to the finish rolling can be prevented. The lower limit of the cooling rate is preferably 20° C./sec, 30° C./sec, 40° C./sec, 50° C./sec, or 60° C./sec. The upper limit of the cooling rate is not particularly set, but from the capacity of usual cooling facilities may be made 100° C./sec or less.

The coiling temperature is made 500° C. or less for the purpose of preventing the Nb (C, N) and Laves phases from coarsening after coiling. Further, from the viewpoint of the toughness, surface defects, and pickling ability, preferably it may be made 450° C. or less, 400° C. or less, 370° C. or less, or 350° C. or less. The lower limit of the coiling temperature is not particularly limited, but if the temperature becomes low, the steel sheet strength becomes higher and coiling becomes difficult, so the coiling temperature is desirably made 300° C. or more.

The thus obtained hot rolled steel sheet (hot rolled sheet) may if necessarily be annealed (hot rolled sheet annealing). If annealing, to obtain a recrystallized structure, the sheet may be heated to a temperature range of 900 to 1050° C. If the heating temperature at the time of annealing is over 1050° C., the Nb-based precipitates start to dissolve and not only does the amount of solute Nb rapidly increase, but the crystal grain size also increases, so the toughness deteriorates. For this reason, the heating temperature at the time of annealing may be made 1050° C. or less, preferably 1100° C. or less. To reduce as much as possible the work strain of hot rolling and obtain a uniform recrystallized structure, the holding time in that temperature range may be made 60 seconds or more. If the holding time is less than 60 seconds, the structure worked by the rolling remains and the toughness drops due to the coarse grains, so the holding time is made 60 seconds or more. On the other hand, if excessively increasing the holding time, not only does the productivity remarkably fall, but also the pickling ability deteriorates, so the holding time is desirably made 90 seconds or less.

Note that, the other conditions in the production process may be suitably selected. For example, the slab thickness, thickness of the hot rolled sheet, etc. may be suitably set. The hot rolled sheet may be dipped in a water cooling pool after coiling. The pickling process after hot rolling or after hot rolling and annealing is not particularly limited. The shot blasting, bending, brushing, or other mechanical descaling method may be suitably selected. The pickling solution is also not particularly limited, so for example the treatment may be performed by sulfuric acid, nitric hydrofluoric acid, or other existing conditions. Further, after that, the surface may be ground.

The ferritic stainless steel sheet produced in this way is worked into a part by stamping, grinding, or other known working method. In particular, the ferritic stainless steel according to the present invention is provided both with excellent toughness and corrosion resistance, so can be applied to a part used in a corrosive environment. In particular, it can be used for at least a portion of exhaust system parts of automobiles or motorcycles. For example, it can be applied to some parts of the exhaust system (exhaust manifold, muffler, etc.) or flanges, brackets, and other fastening parts for fastening these parts.

Parts can be produced by just the ferritic stainless steel, but by joining the part using the ferritic stainless steel with another part, it is possible to obtain a single part. The joining method at that time is not particularly limited, but, for example, brazing or arc welding (TIG, MIG, MAG, and plasma welding) can be applied. The welding conditions can be suitably selected according to the shape of the fastening part or the shape of the other exhaust part.

EXAMPLES

Below, examples will be used to explain the present invention more specifically, but the present invention is not limited to these examples.

The steel of each of the chemical compositions shown in Table 1 (Table 1-1 and Table 1-2 together being called "Table 1") is melted and cast into a slab, then the slab is hot rolled to 5 mm thickness or more to obtain hot rolled coil (hot rolled sheet). At this time, the slab heating temperature was controlled to 1230 to 1280° C., the start temperature of finish rolling to 950 to 1100° C., the finish temperature of finish rolling to 800 to 900° C., the cooling rate to 25° C./sec to 50° C./sec, and the coiling temperature to 300 to 450° C. After that, an annealed coil was also produced. The annealing temperature at this time was made 900 to 1050° C. and the holding time 60 seconds or more.

Table 2 shows the results of a Charpy impact test of coils changed in hot rolling conditions and annealing conditions of steels having the constituents of the present embodiment. If the amount of solute Nb was in a predetermined range due to the production conditions of the present embodiment, a good toughness was obtained, but in the comparative examples where the amounts of solute Nb are not in the predetermined range, the toughnesses fell to levels where running the coils became impossible.

From the hot rolled sheets or hot rolled annealed sheets described in Table 1 and Table 2, Charpy impact test pieces were taken for evaluation of toughness. The results of performing the Charpy impact tests by the above method are shown in the "Impact characteristics" column. Values of the Charpy impact tests of 20 J/cm$^2$ or more were evaluated as passing (good) and values less than 20 J/cm$^2$ were evaluated as not passing (poor) in the "Impact characteristics" column of Table 1. The examples of the present invention all exhibited Charpy impact test values of 20 J/cm$^2$ or more. It was learned that all had excellent toughnesses.

Further, the results of evaluation in brazing using the hot rolled sheets or hot rolled annealed sheets described in Table 1 and Table 2 as materials are shown in the "Braze spreadability" column. The braze spreadability was evaluated by placing a brazing material of Ni-29% Cr-4% Si-6% P (made by Tokyo Braze) (0.1 g) on a flat plate, performing brazing in a 50 PaN$_2$ vacuum at 1130° C. for 10 minutes, then visually examining the braze spreadability. The case where the spreadability of the braze was sufficient was evaluated as passing (good) and the case where the spreadability of the braze was insufficient was evaluated as not passing (poor). Specifically, the state of sufficient spreadability of the braze indicates the spread area of the braze after the braze spreading test being five times or more the coated area of the braze before the test.

Furthermore, the results of evaluation when forming flanges using the hot rolled sheets or hot rolled annealed sheets described in Table 1 and Table 2 as materials, then arc welding them with other exhaust pipe parts are shown in the "Intergranular corrosion of arc welded zone" column. Here, the arc welded joint was investigated the intergranular corrosion sensitivity of the cross-section of the welded zone after TIG welding and was evaluated as not passing (poor) if groove-like structures were observed in a 10% oxalic acid electrolytic etch test based on JIS G0571 and evaluated as passing (good) if step-like structures. The conditions of the TIG welding were current: 200 A, voltage: 10V, speed: 10 cm/min, torch gas: Ar 10 liter/min, back gas: Ar 15 liter/min, after gas: Ar 30 liter/min.

From Table 1 and Table 2, it will be understood that flanges prepared from the steels of the present invention have excellent brazeability and intergranular corrosion resistance.

TABLE 1

| No. | C | Si | Mn | P | S | Cr | N | Ti | Nb | B | Al | Ni | Mo | Cu | V | Mg | Sn |
|---|---|---|---|---|---|---|---|---|---|---|---|---|---|---|---|---|---|
| 1 | 0.004 | 0.10 | 0.10 | 0.024 | 0.0004 | 17.1 | 0.012 | — | 0.26 | 0.0006 | 0.05 | — | — | — | — | — | — |
| 2 | 0.003 | 0.10 | 0.10 | 0.024 | 0.0003 | 17.1 | 0.012 | — | 0.26 | 0.0006 | 0.05 | — | 0.80 | — | — | — | — |
| 3 | 0.003 | 0.20 | 0.20 | 0.023 | 0.0003 | 17.2 | 0.009 | 0.09 | 0.19 | 0.0003 | 0.06 | — | — | — | — | — | — |
| 4 | 0.011 | 0.33 | 0.13 | 0.023 | 0.0007 | 12.3 | 0.018 | — | 0.22 | — | 0.03 | — | — | — | — | — | — |
| 5 | 0.004 | 0.06 | 0.07 | 0.025 | 0.0008 | 17.2 | 0.011 | 0.11 | 0.10 | 0.0005 | — | — | — | — | — | — | — |
| 6 | 0.005 | 0.07 | 0.03 | 0.026 | 0.0010 | 17.4 | 0.013 | — | 0.28 | 0.0003 | 0.02 | — | 0.80 | — | — | — | — |
| 7 | 0.008 | 0.91 | 0.35 | 0.030 | 0.0005 | 13.9 | 0.009 | — | 0.22 | — | 0.03 | 0.10 | — | — | 0.07 | — | — |
| 8 | 0.005 | 0.07 | 0.09 | 0.024 | 0.0010 | 17.2 | 0.013 | 0.11 | 0.28 | 0.0010 | 0.09 | — | 1.10 | — | 0.10 | 0.0006 | — |
| 9 | 0.009 | 0.45 | 0.15 | 0.021 | 0.0007 | 19.1 | 0.019 | — | 0.34 | — | 0.07 | 0.30 | — | 0.40 | — | — | — |
| 10 | 0.013 | 0.22 | 0.27 | 0.022 | 0.0007 | 18.9 | 0.016 | 0.09 | 0.15 | 0.0007 | 0.02 | 0.20 | — | 0.30 | 0.12 | 0.0004 | — |
| 11 | 0.006 | 0.23 | 0.96 | 0.031 | 0.0008 | 17.6 | 0.014 | 0.07 | 0.26 | 0.0005 | 0.06 | — | 1.80 | — | — | — | — |
| 12 | 0.005 | 0.22 | 0.18 | 0.015 | 0.0019 | 17.7 | 0.006 | 0.13 | 0.12 | 0.0004 | 0.03 | — | 0.15 | 1.20 | — | — | — |
| 13 | 0.006 | 0.44 | 0.15 | 0.030 | 0.0009 | 11.6 | 0.006 | 0.17 | 0.10 | 0.0004 | 0.07 | 0.13 | 0.12 | 0.11 | 0.13 | 0.0003 | — |
| 14 | 0.005 | 0.06 | 0.16 | 0.031 | 0.0025 | 11.5 | 0.013 | 0.15 | 0.10 | 0.0006 | 0.05 | 0.70 | — | — | 0.18 | 0.0005 | — |
| 15 | 0.014 | 0.16 | 0.23 | 0.026 | 0.0016 | 14.5 | 0.009 | 0.08 | 0.22 | 0.0006 | 0.05 | — | — | — | — | — | 0.12 |
| 16 | 0.012 | 0.13 | 0.33 | 0.036 | 0.0009 | 17.6 | 0.012 | — | 0.36 | 0.0006 | 0.07 | 0.20 | — | 0.40 | — | — | — |
| 17 | 0.013 | 0.15 | 0.22 | 0.026 | 0.0011 | 17.5 | 0.010 | — | 0.29 | — | — | 0.30 | — | — | — | — | — |
| 18 | 0.005 | 0.41 | 0.45 | 0.032 | 0.0035 | 16.1 | 0.025 | — | 0.10 | — | 0.01 | — | — | 0.20 | 0.15 | 0.0005 | — |
| 19 | 0.006 | 0.35 | 0.09 | 0.025 | 0.0009 | 19.5 | 0.017 | 0.17 | 0.22 | 0.0004 | 0.07 | 0.13 | 1.50 | 0.11 | 0.13 | 0.0003 | 0.06 |
| 20 | 0.092 | 0.24 | 0.37 | 0.020 | 0.0009 | 10.7 | 0.011 | — | — | — | — | — | — | — | — | — | — |

TABLE 1-continued

| No. | | | | | | | | | | | | | | | | | |
|---|---|---|---|---|---|---|---|---|---|---|---|---|---|---|---|---|---|
| 21 | 0.005 | 1.56 | 0.25 | 0.020 | 0.0009 | 17.3 | 0.006 | 0.18 | — | 0.0009 | 0.09 | — | — | — | — | — | — |
| 22 | 0.013 | 0.32 | 1.43 | 0.020 | 0.0012 | 14.5 | 0.010 | — | 0.25 | — | — | — | — | — | — | — | — |
| 23 | 0.003 | 0.42 | 0.43 | 0.060 | 0.0002 | 16.3 | 0.010 | 0.12 | — | 0.0007 | 0.05 | — | — | — | — | — | — |
| 24 | 0.007 | 0.26 | 0.32 | 0.019 | 0.0125 | 18.8 | 0.013 | 0.16 | — | — | — | — | — | — | — | — | — |
| 25 | 0.012 | 0.31 | 0.34 | 0.040 | 0.0026 | 25.3 | 0.005 | — | — | 0.0005 | — | — | — | — | — | — | — |
| 26 | 0.004 | 0.25 | 0.36 | 0.020 | 0.0015 | 17.5 | 0.060 | 0.12 | — | — | — | — | — | — | — | — | — |
| 27 | 0.003 | 0.26 | 0.12 | 0.030 | 0.0053 | 14.1 | 0.015 | 0.46 | — | — | — | — | — | — | — | — | — |
| 28 | 0.008 | 0.39 | 0.12 | 0.032 | 0.0035 | 16.2 | 0.005 | — | 0.65 | 0.0100 | — | — | — | — | — | — | — |
| 29 | 0.009 | 0.29 | 0.26 | 0.010 | 0.0015 | 19.5 | 0.005 | — | — | 0.0035 | — | — | — | — | — | — | — |
| 30 | 0.006 | 0.36 | 0.33 | 0.040 | 0.0033 | 11.1 | 0.007 | — | — | — | 0.36 | — | — | — | — | — | — |
| 31 | 0.002 | 0.42 | 0.42 | 0.020 | 0.0032 | 13.8 | 0.006 | — | — | — | — | 1.50 | — | — | — | — | — |
| 32 | 0.003 | 0.17 | 0.26 | 0.030 | 0.0013 | 16.5 | 0.012 | — | — | — | 0.04 | — | 2.60 | — | — | — | — |
| 33 | 0.011 | 0.25 | 0.27 | 0.020 | 0.0023 | 11.9 | 0.006 | — | — | — | — | — | — | 3.30 | — | — | — |
| 34 | 0.005 | 0.31 | 0.21 | 0.010 | 0.0016 | 13.5 | 0.010 | — | — | — | 0.03 | — | — | — | 1.20 | — | — |
| 35 | 0.009 | 0.39 | 0.12 | 0.040 | 0.0022 | 14.5 | 0.013 | — | — | 0.0005 | — | — | — | — | — | 0.0042 | — |
| 36 | 0.006 | 0.21 | 0.33 | 0.030 | 0.0007 | 17.3 | 0.016 | — | — | — | — | — | — | — | — | — | 0.45 |
| 37 | 0.005 | 0.32 | 0.17 | 0.050 | 0.0011 | 13.6 | 0.013 | — | — | — | 0.06 | — | — | — | — | — | — |
| 38 | 0.005 | 0.21 | 0.25 | 0.010 | 0.0025 | 16.3 | 0.009 | — | — | — | 0.13 | — | — | — | — | — | — |
| 39 | 0.056 | 0.13 | 0.65 | 0.016 | 0.0046 | 11.5 | 0.035 | — | — | — | — | — | — | — | — | — | — |
| 40 | 0.043 | 0.96 | 0.95 | 0.025 | 0.0056 | 10.9 | 0.045 | — | — | — | — | — | — | — | — | — | — |
| 41 | 0.055 | 0.85 | 0.35 | 0.035 | 0.0076 | 16.5 | 0.033 | — | — | — | — | — | — | — | — | — | — |
| 42 | 0.063 | 0.65 | 0.64 | 0.019 | 0.0009 | 17.5 | 0.035 | — | — | — | — | — | — | — | — | — | — |
| 43 | 0.042 | 0.43 | 0.56 | 0.037 | 0.0016 | 17.6 | 0.039 | — | — | — | — | — | — | — | — | — | — |
| 44 | 0.009 | 0.33 | 0.13 | 0.015 | 0.0016 | 10.8 | 0.015 | 0.12 | — | — | — | — | — | — | — | — | — |

| | Constituent (mass %) | | | | | | | | | Hot rolled sheet/ hot rolled annealed |
|---|---|---|---|---|---|---|---|---|---|---|
| No. | Sb | Zr | Ta | Hf | W | Co | Ca | REM | Ga | sheet |
| 1 | — | — | — | — | — | — | — | — | — | Hot rolled annealed sheet |
| 2 | — | — | — | — | — | — | — | — | — | Hot rolled annealed sheet |
| 3 | — | — | — | — | — | — | — | — | — | Hot rolled sheet |
| 4 | — | — | — | — | — | — | — | — | — | Hot rolled annealed sheet |
| 5 | — | — | — | — | — | — | — | — | — | Hot rolled annealed sheet |
| 6 | — | — | — | — | — | — | — | — | — | Hot rolled sheet |
| 7 | — | — | — | — | — | — | 0.0005 | — | — | Hot rolled annealed sheet |
| 8 | — | — | — | — | — | — | — | — | — | Hot rolled annealed sheet |
| 9 | — | — | — | — | — | — | — | — | — | Hot rolled annealed sheet |
| 10 | — | — | — | — | — | — | 0.0007 | — | — | Hot rolled sheet |
| 11 | — | — | — | — | — | — | — | — | — | Hot rolled annealed sheet |
| 12 | — | — | — | — | — | — | — | — | — | Hot rolled annealed sheet |
| 13 | — | — | — | — | — | — | — | — | — | Hot rolled sheet |
| 14 | — | — | — | 0.06 | — | — | 0.0018 | 0.010 | — | Hot rolled annealed sheet |
| 15 | — | — | — | — | — | — | — | 0.020 | — | Hot rolled sheet |
| 16 | 0.15 | — | — | — | — | — | — | — | — | Hot rolled annealed sheet |
| 17 | — | — | — | — | 1.50 | — | — | — | — | Hot rolled sheet |
| 18 | — | 0.05 | — | — | — | 0.09 | — | — | — | Hot rolled annealed sheet |
| 19 | 0.05 | 0.07 | 0.05 | 0.05 | 0.06 | 0.05 | 0.0011 | 0.008 | 0.002 | Hot rolled annealed sheet |
| 20 | — | — | — | — | — | — | — | — | — | Hot rolled annealed sheet |
| 21 | — | — | — | — | — | — | — | — | — | Hot rolled sheet |
| 22 | — | — | — | — | — | — | — | — | — | Hot rolled annealed sheet |
| 23 | — | — | — | — | — | — | — | — | — | Hot rolled annealed sheet |
| 24 | — | — | — | — | — | — | — | — | — | Hot rolled annealed sheet |
| 25 | — | — | — | — | — | — | — | — | — | Hot rolled annealed sheet |
| 26 | — | — | — | — | — | — | — | — | — | Hot rolled annealed sheet |
| 27 | — | — | — | — | — | — | — | — | — | Hot rolled annealed sheet |
| 28 | — | — | — | — | — | — | — | — | — | Hot rolled sheet |
| 29 | — | — | — | — | — | — | — | — | — | Hot rolled annealed sheet |
| 30 | — | — | — | — | — | — | — | — | — | Hot rolled annealed sheet |
| 31 | — | — | — | — | — | — | — | — | — | Hot rolled sheet |
| 32 | — | — | — | — | — | — | — | — | — | Hot rolled annealed sheet |
| 33 | — | — | — | — | — | — | — | — | — | Hot rolled annealed sheet |
| 34 | — | — | — | — | — | — | — | — | — | Hot rolled sheet |
| 35 | — | — | — | — | — | — | — | — | — | Hot rolled annealed sheet |
| 36 | — | — | — | — | — | — | — | — | — | Hot rolled annealed sheet |
| 37 | 0.36 | — | — | — | — | — | — | — | — | Hot rolled annealed sheet |
| 38 | — | 0.20 | — | — | — | — | — | — | — | Hot rolled annealed sheet |

TABLE 1-continued

| | | | | | | | | | | |
|---|---|---|---|---|---|---|---|---|---|---|
| 39 | — | — | 0.30 | — | — | — | — | — | — | Hot rolled annealed sheet |
| 40 | — | — | — | 0.20 | — | — | — | — | — | Hot rolled annealed sheet |
| 41 | — | — | — | — | 2.30 | — | — | — | — | Hot rolled annealed sheet |
| 42 | — | — | — | — | — | 0.30 | — | — | — | Hot rolled annealed sheet |
| 43 | — | — | — | — | — | — | 0.0045 | — | — | Hot rolled annealed sheet |
| 44 | — | — | — | — | — | — | — | 0.060 | — | Hot rolled annealed sheet |

| No. | Amount of solute Nb (mass %) | Nb-containing precipitate density (/µm2) | Impact characteristics | Braze spreadability | Intergranular corrosion of arc welded zone | Remarks |
|---|---|---|---|---|---|---|
| 1 | 0.18 | 0.005 | Good | Good | Good | Ex. |
| 2 | 0.16 | 0.005 | Good | Good | Good | |
| 3 | 0.10 | 0.004 | Good | Good | Good | |
| 4 | 0.11 | 0.004 | Good | Good | Good | |
| 5 | 0.01 | 0.001 | Good | Good | Good | |
| 6 | 0.18 | 0.005 | Good | Good | Good | |
| 7 | 0.11 | 0.005 | Good | Good | Good | |
| 8 | 0.01 | 0.004 | Good | Good | Good | |
| 9 | 0.19 | 0.005 | Good | Good | Good | |
| 10 | 0.05 | 0.003 | Good | Good | Good | |
| 11 | 0.16 | 0.005 | Good | Good | Good | |
| 12 | 0.02 | 0.002 | Good | Good | Good | |
| 13 | 0.01 | 0.001 | Good | Good | Good | |
| 14 | 0.01 | 0.001 | Good | Good | Good | |
| 15 | 0.12 | 0.003 | Good | Good | Good | |
| 16 | 0.16 | 0.005 | Good | Good | Good | |
| 17 | 0.19 | 0.004 | Good | Good | Good | |
| 18 | 0.01 | 0.001 | Good | Good | Good | |
| 19 | 0.12 | 0.005 | Good | Good | Good | |
| 20 | 0 | — | Poor | Good | Poor | Comp. ex. |
| 21 | 0 | — | Poor | Good | Good | |
| 22 | 0.15 | 0.006 | Poor | Good | Good | |
| 23 | 0 | — | Poor | Poor | Poor | |
| 24 | 0 | — | Poor | Good | Good | |
| 25 | 0 | — | Poor | Poor | Good | |
| 26 | 0 | — | Poor | Good | Poor | |
| 27 | 0 | — | Poor | Poor | Good | |
| 28 | 0.54 | 0.012 | Poor | Good | Good | |
| 29 | 0 | — | Poor | Good | Poor | |
| 30 | 0 | — | Poor | Poor | Good | |
| 31 | 0 | — | Poor | Poor | Poor | |
| 32 | 0 | — | Poor | Good | Good | |
| 33 | 0 | — | Poor | Poor | Poor | |
| 34 | 0 | — | Poor | Good | Good | |
| 35 | 0 | — | Poor | Poor | Good | |
| 36 | 0 | — | Poor | Good | Good | |
| 37 | 0 | — | Poor | Good | Good | |
| 38 | 0 | — | Poor | Good | Good | |
| 39 | 0 | — | Poor | Good | Good | |
| 40 | 0 | — | Poor | Good | Good | |
| 41 | 0 | — | Poor | Good | Good | |
| 42 | 0 | — | Poor | Good | Good | |
| 43 | 0 | — | Poor | Poor | Good | |
| 44 | 0 | — | Poor | Good | Good | |

TABLE 2

| | Hot rolling conditions | | | | | | Annealing conditions | |
|---|---|---|---|---|---|---|---|---|
| | | Finish rolling | | | | | | |
| Steel no. | Heating temp. °C. | Start temp. °C. | End temp. °C. | Start temp./end temp. | Cooling rate °C./sec | Coiling temp. °C. | Sheet thickness mm | Heating temp. °C. | Holding time sec |
| 1 | 1250 | 1070 | 850 | 1.26 | 25 | 470 | 8 | 970 | 60 |
| 2 | 1250 | 1070 | 840 | 1.27 | 25 | 450 | 8 | 1000 | 100 |
| 2 | 1250 | 1070 | 860 | 1.24 | 50 | 450 | 9 | 1000 | 90 |
| 2 | 1230 | 1050 | 830 | 1.27 | 100 | 350 | 7 | 990 | 60 |
| 2 | 1230 | 1050 | 830 | 1.27 | 73 | 350 | 7 | No annealing | |
| 4 | 1230 | 1050 | 820 | 1.28 | 25 | 350 | 8 | 920 | 120 |
| 4 | 1230 | 1050 | 880 | 1.19 | 65 | 350 | 13 | 950 | 80 |

TABLE 2-continued

| 5 | 1250 | 1060 | 900 | 1.18 | 30 | 400 | 13 | 980 | 90 |
|---|---|---|---|---|---|---|---|---|---|
| 7 | 1230 | 1020 | 800 | 1.28 | 47 | 420 | 5 | 1000 | 60 |
| 7 | 1230 | 1020 | 820 | 1.24 | 95 | 420 | 8 | 960 | 90 |
| 7 | 1230 | 1020 | 830 | 1.23 | 82 | 420 | 13 | 950 | 100 |
| 8 | 1250 | 1050 | 850 | 1.24 | 53 | 330 | 8 | 970 | 60 |
| 9 | 1250 | 1050 | 830 | 1.27 | 48 | 330 | 9 | 1050 | 70 |
| 12 | 1250 | 1010 | 840 | 1.20 | 27 | 300 | 5 | 950 | 60 |
| 1 | 1250 | 930 | 860 | 1.08 | 18 | 470 | 8 | 970 | 60 |
| 2 | 1250 | 1070 | 840 | 1.27 | 10 | 530 | 8 | 1000 | 100 |
| 2 | 1230 | 1050 | 830 | 1.05 | 9 | 350 | 7 | No annealing | |
| 4 | 1230 | 1050 | 990 | 1.06 | 13 | 350 | 8 | 920 | 120 |
| 7 | 1210 | 900 | 830 | 1.08 | 18 | 420 | 13 | 950 | 100 |
| 8 | 1200 | 1050 | 830 | 1.27 | 17 | 330 | 9 | 1050 | 70 |
| 9 | 1250 | 1050 | 830 | 1.27 | 5 | 330 | 9 | 1070 | 70 |

| | Properties | | | | |
|---|---|---|---|---|---|
| Steel no. | Amount of solute Nb Mass % | Nb-containing precipitate density (/μm2) | Impact characteristics | Braze spreadability | Intergranular corrosion of arc welded zone | Remarks |
|---|---|---|---|---|---|---|
| 1 | 0.18 | 0.005 | Good | Good | Good | Ex. |
| 2 | 0.16 | 0.005 | Good | Good | Good | |
| 2 | 0.16 | 0.004 | Good | Good | Good | |
| 2 | 0.15 | 0.003 | Good | Good | Good | |
| 2 | 0.11 | 0.004 | Good | Good | Good | |
| 4 | 0.11 | 0.002 | Good | Good | Good | |
| 4 | 0.11 | 0.003 | Good | Good | Good | |
| 5 | 0.01 | 0.005 | Good | Good | Good | |
| 7 | 0.11 | 0.004 | Good | Good | Good | |
| 7 | 0.11 | 0.003 | Good | Good | Good | |
| 7 | 0.11 | 0.003 | Good | Good | Good | |
| 8 | 0.01 | 0.005 | Good | Good | Good | |
| 9 | 0.19 | 0.005 | Good | Good | Good | |
| 12 | 0.02 | 0.004 | Good | Good | Good | |
| 1 | 0.21 | 0.006 | Poor | Good | Good | Comp. ex. |
| 2 | 0.22 | 0.007 | Poor | Good | Good | |
| 2 | 0.22 | 0.008 | Poor | Good | Good | |
| 4 | 0.21 | 0.006 | Poor | Good | Good | |
| 7 | 0.22 | 0.015 | Poor | Good | Good | |
| 8 | 0.24 | 0.010 | Poor | Good | Good | |
| 9 | 0.25 | 0.009 | Poor | Good | Good | |

INDUSTRIAL APPLICABILITY

The ferritic stainless steel steel, method of producing the same, and connecting part including that ferritic stainless steel sheet according to the present invention can be utilized in all sorts of industries. In particular, by use as automobile and motorcycle parts, reliability can be secured and the contribution to society can be enhanced, so this is advantageous in industry.

The invention claimed is:

1. A ferritic stainless steel sheet comprising, by mass %,
C: 0.001 to 0.030%,
Si: 0.01 to 1.00%,
Mn: 0.01 to 1.00%,
P: 0.010 to 0.050%,
S: 0.0002 to 0.0100%,
Cr: 10.0 to 20.0%,
N: 0.001 to 0.030%,
Nb: 0.10 to 0.40%,
B: 0 to 0.0030%,
Al: 0 to 0.100%,
Ti: 0 to 0.20%,
Ni: 0 to 1.00%,
Mo: 0 to 2.0%,
Cu: 0 to 3.0%,
V: 0 to 1.00%,
Mg: 0 to 0.0030%,
Sn: 0 to 0.30%,
Sb: 0 to 0.30%,
Zr: 0 to 0.10%,
Ta: 0 to 0.10%,
Hf: 0 to 0.10%,
W: 0 to 2.00%,
Co: 0 to 0.20%,
Ca: 0 to 0.0030%,
REM: 0 to 0.050%,
Ga: 0 to 0.10%,
a balance of Fe and unavoidable impurities,
an amount of solute Nb being less than or equal to a smaller value of 0.20 mass % and (Nb content-0.08) mass %.

2. The ferritic stainless steel sheet according to claim 1, wherein when a thickness of the stainless steel sheet is "t", a number density of Nb-containing precipitates of grain sizes of 1 μm or more is 0.005/μm$^2$ or less in a depth range of t/2 to t/4 from a surface in a cross-section in a thickness direction.

3. The ferritic stainless steel sheet according to claim 1, wherein a grain size of the Nb-containing precipitate is 2 μm or less.

4. The ferritic stainless steel sheet according to claim 2, wherein a grain size of the Nb-containing precipitate is 2 μm or less.

5. A method for producing the ferritic stainless steel sheet according to claim 1 comprising, heating a slab comprising, by mass %,
C: 0.001 to 0.030%,
Si: 0.01 to 1.00%,
Mn: 0.01 to 1.00%,
P: 0.010 to 0.050%,
S: 0.0002 to 0.0100%,
Cr: 10.0 to 20.0%,
N: 0.001 to 0.030%,
Nb: 0.10 to 0.40%,
B: 0 to 0.0030%,
Al: 0 to 0.100%,
Ti: 0 to 0.20%,
Ni: 0 to 1.00%,
Mo: 0 to 2.0%,
Cu: 0 to 3.0%,
V: 0 to 1.00%,
Mg: 0 to 0.0030%,
Sn: 0 to 0.30%,
Sb: 0 to 0.30%,
Zr: 0 to 0.10%,
Ta: 0 to 0.10%,
Hf: 0 to 0.10%,
W: 0 to 2.00%,
Co: 0 to 0.20%,
Ca: 0 to 0.0030%,
REM: 0 to 0.050%,
Ga: 0 to 0.10%,
a balance of Fe and unavoidable impurities,
an amount of solute Nb being less than or equal to a smaller value of 0.20 mass % and (Nb content-0.08) mass %, to 1230° C. or more, hot rolling so that a ratio of a start temperature of finish rolling (° C.) and a finish temperature of finish rolling (° C.) (start temperature of finish rolling (° C.)/finish temperature of finish rolling (° C.)) becomes 1.10 or more, then coiling at 500° C. or less.

6. The method for producing the ferritic stainless steel sheet according to claim 5 further comprising cooling the hot rolled steel sheet at a cooling rate of 20° C./sec or more, then coiling the hot rolled steel sheet.

7. The method for producing the ferritic stainless steel sheet according to claim 5 further comprising heating the coiled steel sheet to 900 to 1050° C., then holding and annealing the coiled steel sheet for 60 seconds or more.

8. The method for producing the ferritic stainless steel sheet according to claim 6 further comprising heating the coiled steel sheet to 900 to 1050° C., then holding and annealing the coiled steel sheet for 60 seconds or more.

9. A part using the ferritic stainless steel sheet according to claim 1 for at least a portion.

10. The part according to claim 9 wherein the part using the ferritic stainless steel sheet is joined with another part by brazing or arc welding.

* * * * *